(12) United States Patent
Gou et al.

(10) Patent No.: US 10,068,204 B2
(45) Date of Patent: Sep. 4, 2018

(54) MODELING AND VISUALIZING A DYNAMIC INTERPERSONAL RELATIONSHIP FROM SOCIAL MEDIA

(71) Applicant: International Business Machines Corporation, Armonk, NY (US)

(72) Inventors: Liang Gou, San Jose, CA (US); Aditya Pal, San Jose, CA (US); Fei Wang, San Jose, CA (US); Wei Zhang, Ossining, NY (US); Michelle Zhou, Saratoga, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1026 days.

(21) Appl. No.: 14/338,433

(22) Filed: Jul. 23, 2014

(65) Prior Publication Data
US 2016/0026738 A1  Jan. 28, 2016

(51) Int. Cl.
| | | |
|---|---|---|
| *G06F 7/60* | (2006.01) | |
| *G06F 17/10* | (2006.01) | |
| *G06Q 10/10* | (2012.01) | |
| *G06Q 50/00* | (2012.01) | |
| *G06Q 30/02* | (2012.01) | |

(52) U.S. Cl.
CPC ....... *G06Q 10/107* (2013.01); *G06Q 30/0204* (2013.01); *G06Q 50/01* (2013.01)

(58) Field of Classification Search
CPC .. G06F 17/5009; G06F 17/10; G06F 2217/16; G06F 17/16
USPC .......................................................... 703/2
See application file for complete search history.

(56) References Cited

U.S. PATENT DOCUMENTS

| | | |
|---|---|---|
| 2008/0104225 A1 | 5/2008 | Zhang et al. |
| 2009/0216806 A1 | 8/2009 | Feuerstein et al. |
| 2011/0035677 A1 | 2/2011 | Vitale et al. |
| 2011/0167115 A1 | 7/2011 | Gilbert et al. |

(Continued)

FOREIGN PATENT DOCUMENTS

EP    2568427 A1    3/2013

OTHER PUBLICATIONS

Samangooei et al. "D3. 1.2 Regression models of trends Tools for Mining Non-stationary Data Functional prototype", FP7-ICT Strategic Targeted Research Project (STREP) TrendMiner (No. 287863), Apr. 30, 2013, pp. 1-56.*

*Primary Examiner* — Saif A Alhija
(74) *Attorney, Agent, or Firm* — Cantor Colburn LLP

(57) ABSTRACT

Embodiments relate to relationship modeling and visualization from social media. One aspect includes determining a relationship type of a network-based relationship, between an individual and a network contact of the individual, from at least one social media data source. The relationship type is determined using a relationship model based on relationship types that include operational, personal, and business. Another aspect includes performing timeline based relationship strength segmentation using Group Lasso. The timeline based relationship strength segmentation specifies a past and current strength of the relationship. A further aspect includes predicting a future strength of the relationship using Extended Kalman Filter, and providing, through a visual interface, interactive visual analytics to view and monitor relationship states including the past, current, and future strengths over time.

20 Claims, 7 Drawing Sheets

(56) References Cited

U.S. PATENT DOCUMENTS

| | | |
|---|---|---|
| 2012/0096037 A1 | 4/2012 | Sittig et al. |
| 2012/0271722 A1 | 10/2012 | Juan et al. |
| 2012/0311030 A1* | 12/2012 | Lin .................... G06F 15/16 709/204 |
| 2013/0054604 A1 | 2/2013 | Boldyrev et al. |
| 2013/0151330 A1 | 6/2013 | Evancich et al. |
| 2013/0212173 A1 | 8/2013 | Carthcart et al. |
| 2013/0212192 A1* | 8/2013 | Yerli .................... H04L 51/32 709/206 |

* cited by examiner

Three forms of relationship networking

| | Operational | Personal | Strategic |
|---|---|---|---|
| Purpose | Getting work done efficiently; | Enhancing personal and professional development; providing referrals to useful information and contacts | Figuring out future priorities and challenges; getting stakeholder support for them |
| Location and temporal orientation | Mostly internal and oriented toward current demands | Mostly external and oriented towards current interests and future potential interests | Contacts are internal and external and oriented towards future |
| Players and recruitment | Key contacts are relatively nondiscretionary; prescribed mostly by the task and organizational structure | Key contacts are most discrete | Key contacts follow from the strategic context |
| Network attributes and key behavior | Depth: building strong working relationships | Breadth: reaching out to contacts who can make referrals | Leverage: creating inside-outside links |

FIG. 1

MODELING AND VISUALIZING A DYNAMIC INTERPERSONAL RELATIONSHIP FROM SOCIAL MEDIA

BACKGROUND

The present disclosure relates generally to social media based analytics, and more specifically, to modeling and visualizing a dynamic interpersonal relationship from social media.

In today's hyper-connected world, enterprises are increasingly adopting social media tools to foster interactivity and engagement, promote collaboration amongst employees, and drive innovation. Additionally, more and more companies are joining commercial networking sites, such as Facebook® and Twitter® to promote their brand and reach out to potential customers.

To this end, many businesses are seeking new ways to help them understand their relationships with their customers through social media. Likewise, many individuals seek to understand and foster their relationships with others who are in their contact directory.

SUMMARY

Embodiments include a method, system, and computer program product for relationship modeling and visualization from social media. A method includes determining a relationship type of a network-based relationship, between an individual and a network contact of the individual, from at least one social media data source. The relationship type is determined using a relationship model based on relationship types that include operational, personal, and business. The method also includes performing timeline based relationship strength segmentation using Group Lasso. The timeline based relationship strength segmentation specifies a past and current strength of the relationship. The method further includes predicting a future strength of the relationship using Extended Kalman Filter, and providing, through a visual interface, interactive visual analytics to view and monitor relationship states including the past, current, and future strengths over time.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1 depicts a table of sample relationship types and related information;

DETAILED DESCRIPTION

Figure 2:
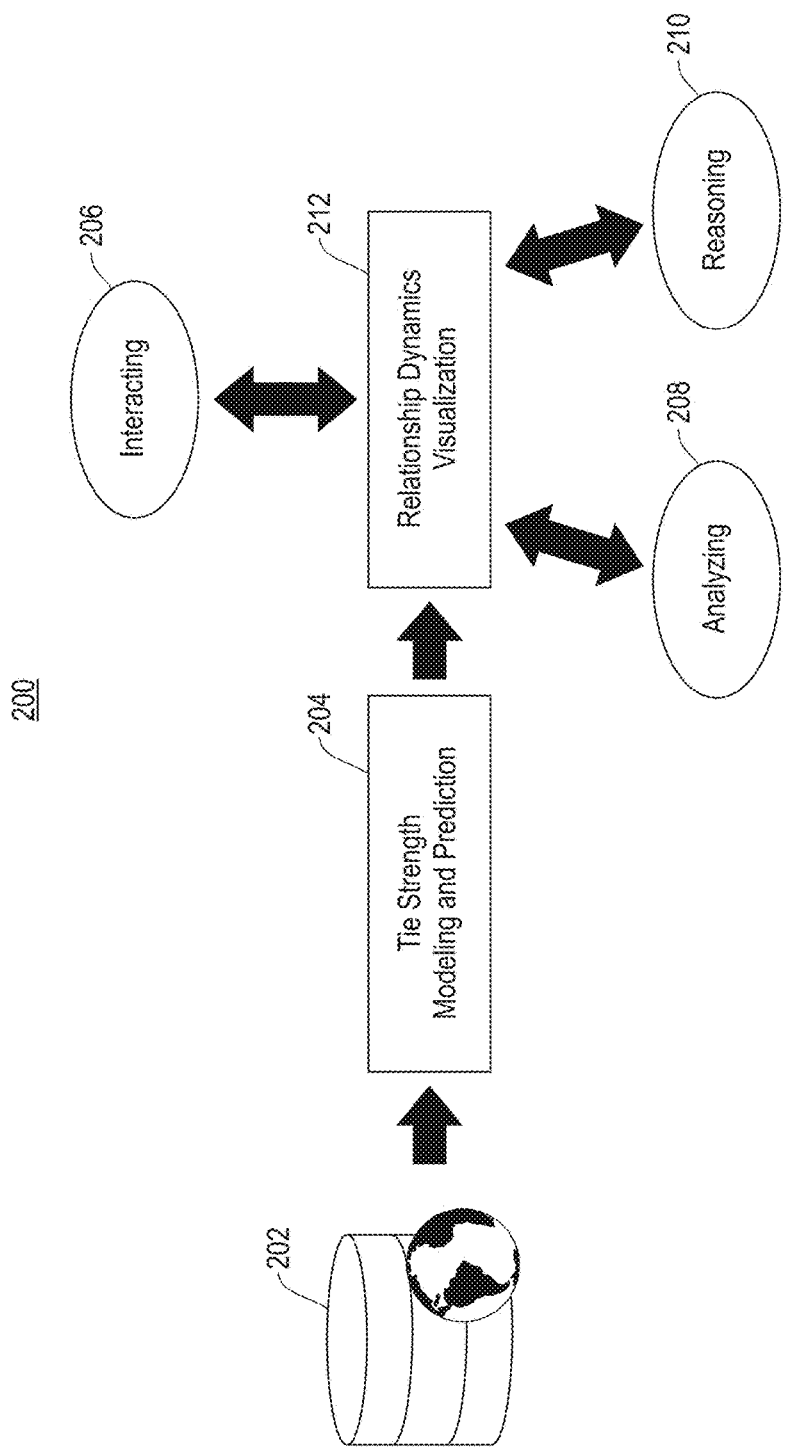
FIG. 2 depicts a system for relationship modeling and visualization in accordance with an embodiment.

An interpersonal relationship may be described as an association between two parties over some duration of time. Such relationships are considered dynamic in that they exhibit an evolution, trend, and pattern over time. Analysis of an interpersonal relationship to determine its strength can be useful to the parties involved, in order to enable the parties to take proactive measures to maintain and develop the relationship. Since relationships are dynamic, such analysis needs to factor in characteristics of the evolution of the relationship.

In performing an analysis of a relationship, different needs or requirements arise depending on the nature of the relationship (e.g., whether the relationship is personal or business). For example, techniques such as tie strength analysis may be suitable for gaining insight into social connections in a personal environment, but may not be sufficient to provide deep insight into social connections in a business environment. Further, there likely exist several differences in the desired goals for those individuals using a social network within an enterprise as opposed to those using a social network outside of the enterprise. For example, creating a fabric of personal contacts that will provide support, feedback, and information may be most important to users in an enterprise environment, as compared to users in a personal network environment.

Thus, a user's network may be composed of various relationship types. As shown generally at 102 in table 100 of FIG. 1, relationship types may include operational, personal, and strategic. Each relationship type may differ in its purpose, location and temporal orientation, players and recruitment, and network attributes and key behavior, as illustrated in the table 100. For example, the purpose of a relationship type that is operational may be to help a user manage current internal responsibilities. The purpose of a relationship type that is personal may be to boost the user's personal development. The purpose of a relationship type that is strategic may be to facilitate new business directions and identify stakeholders to enlist that will support these goals. The exemplary social media-based relationship modeling and visualization techniques classify interpersonal relationships based on relationship types, as will be described further herein.

The exemplary embodiments described herein focus on modeling and visualizing the evolution of interpersonal, or person-to-person, relationships over time. In particular, the relationship modeling and visualization determines the context in which people connect with one another (e.g., common interests, business, etc.). The relationship type (e.g., operational, personal, or strategic) between the user and his/her contacts is determined. This information is used in determining the strength of the relationship over time (past and current), and relationship strength predictions for the future are calculated to provide insight to an individual who may then take action to maintain or improve the relationship.

The relationship modeling and visualization processes provide both information summarization and decision support. For example, the relationship modeling and visualization processes present the relationship evolution in the past, current and future. Further, the time series relationship is visualized to show not only the evolution trend, but also the events resulting in the trend changes. These features are illustrated further in FIG. 4. Based on the temporal relationship modeling and visualization, individuals can take actions to maintain their relationships.

With reference now to FIG. 2, a system 200 for relationship modeling and visualization from social media, according to an embodiment, is illustrated. The system 200 includes at least one data source 202 from which data is extracted. It will be understood, however, that data may come from various different sources, e.g., social network postings, LinkedIn profiles, email communications, etc. The relationship modeling and visualization processes are directed to analyzing an ego-centric network with respect to a user. As such, the features extracted from the data source 202 relate to each individual that is in the user's social network (i.e., those having an interpersonal relationship with the user).

These features can be classified into two categories: stable and dynamic. Stable features relate to data that is unchanged over time (also referred to herein as "time invariant") and include education background (e.g., school attended, academic major, etc.), work experiences (e.g., employer name, job title or position held, reporting chain within a company and industry), tags (e.g., similar research interests, specialties, and others, and social connections (e.g., direct or indirect friends, interest groups, etc.). These features are denoted herein as s_i.

Dynamic features (also referred to as "time variant") may include communications between the user and each of his/her contacts, such as the number of times/frequency of face to face meetings, cell phone communications, instant messages, emails, and microblog interactions, to name a few. These features are denoted herein as f_i.

Generally stable, or time invariant features, such as qualities or characteristics of individuals are used in the tie strength modeling and prediction processes described herein. These features may include personality, inferred or expressed needs, and inferred or expressed values. It is understood that people with similar personalities, needs, and values tend to have stronger relationships. Thus, the embodiments described herein may apply greater weight to these qualities or characteristics in the analysis and processing. For example, automated machine learning models may be used to determine the weights for different features using knowledge or user-defined rules.

Turning back to FIG. 2, the system 200 also includes a tie strength modeling and prediction module 204 and a relationship dynamics visualization module 212. The tie strength modeling and prediction module 204 receives the data extracted from the data source 202 and processes the data to classify relationships by type, determine relationship strength, and forecast future relationship strength. The results are provided to the relationship dynamics and visualization module 212.

The relationship dynamics visualization module 212 provides a visual interface with results of the processing of the module 204, and the user may interact 206 with the interface (e.g., through inputs), analyze 208 the results via the interface, and understand the reasoning 210 for changes to the relationships presented via the interface. A visual interface is shown and described in FIG. 4.

As indicated above, the relationship modeling and classification processes classify relationships of the user by relationship types. This may be implemented by providing learning-based relationship type classifications (e.g., operational, personal, strategic). To classify a personal relationship type, a learning based scheme may be used that trains on the people of known relationship types and associated feature vectors.

A multiclass support vector machine (SVM) may be implemented for training and test of the relationship type classification system. The SVM relies only on the dot product in the feature space, which can be computed efficiently via a kernel technique. The kernel is constructed from the distance between the feature vectors. Once it is done, it is then fed to the multiclass SVM for the training of the classification system, from which a decision boundary may be obtained for each of the relationship types in feature space. During the testing stage, the features of each contact in the user's social directory are compared with the decision boundary to obtain the classification results.

Figure 3:
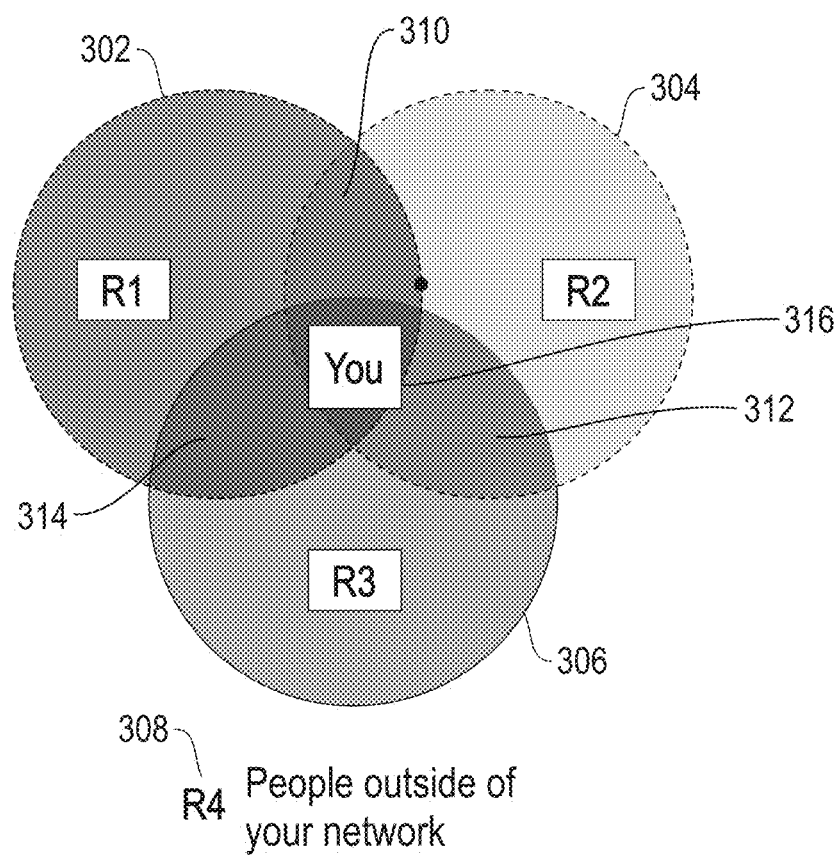
FIG. 3 depicts a sample relationship type model classification in accordance with an embodiment.

A sample SVM 300 generated from relationship type model classification is shown in FIG. 3. The SVM 300 illustrates three relationships 302 (R1), 304 (R2), and 306 (R3) inside the user's network, and a fourth relationship 308 (R4) outside of the user's network. The SVM 300 includes overlapping features between R1 and R2, denoted as 310, overlapping features between R2 and R3, denoted as 312, and overlapping features between R2 and R3, denoted as 314. Features of these relationships that are in common with the user are reflected as 316.

Next, an estimation of the relationship strength is determined for each relationship type, which is also referred to herein as timeline based relationship strength segmentation. A temporal interpersonal tie strength C(t), where t is a series of N discrete time intervals, is calculated. The dynamic tie strength can be expressed as:

$$C(p_1, p_2, t_0) = \sum_i w_{s_i} s_i + \sum_j w_{f_j} \int_0^{t_0} f_j(t)$$

where p_1 and p_2 represent two people, and s_i and f_j denote the similarity between p_1 and p_2 based on the stable features and dynamic features, respectively. Alpha, Beta, w_si and w_fj represent the corresponding weights associated with the group or individual features. The weights applied may be a function of the type of relationship where there are distinct differences between the relevance of features based on relationship type. The estimation of the weights can be treated as a regression problem, which may be solved by using group lasso, and may be expressed as:

$$\hat{\beta}_\lambda = \mathrm{argmin}(\|C - X\beta\|_2^2) + \lambda \sum_{g=1}^{G} \|\beta_{I_g}\|_2$$

where C is the tie strength vector collected through surveys, and is used as ground truth for the regression problem, and X is the feature matrix, which is composed of both stable features and dynamic features.

The weight parameters to estimate are:

$$\beta = \{w_{s_1}, \ldots, w_{s_M}, w_{f_1}, \ldots, w_{f_N}\}|$$

I_g is the index set belongs to the gth group of variables. These variables are naturally divided into two groups, i.e., weights associated with stable features {w_s_i} and those associated with dynamic features {w_f_j}. The second term in the equation is the group lasso penalty term, which can be viewed as an intermediate between the L1- and L2-type penalties. It provides variable selection at the group level and is invariant under (groupwise) orthogonal transformations, such as ridge regression. It will be noted that this regression is performed for each relationship type, as different features may weight differently in different relationship types.

In addition to the past and current tie strengths calculated above, the future tie strength is also estimated to compose a complete dynamic relationship along the timeline. Particularly, the future tie strength trend is indicative for needed actions to be taken to maintain an expected relationship. This may be implemented through adaptive Kalman filter. A Kalman filter tracks a time-series using a two-stage process: a prediction step and update steps. For the prediction step, at every point in the time-series, a prediction is made of the next value based on a few of the most recent estimates, and on the data model contained in the Kalman filter equations. Update steps are implemented for incorporating a new measurement into the a priori estimate to obtain an improved a posteriori estimate. The extended Kalman filter (EKF) is the nonlinear version of the Kalman Filter, in which the state transition and observation models are non-linear functions.

The EKF is implemented to predict future relationship strength. It supports estimations of past, present, and even future states, and it can do so even when the precise nature of the modeled system is unknown.

Figure 4:
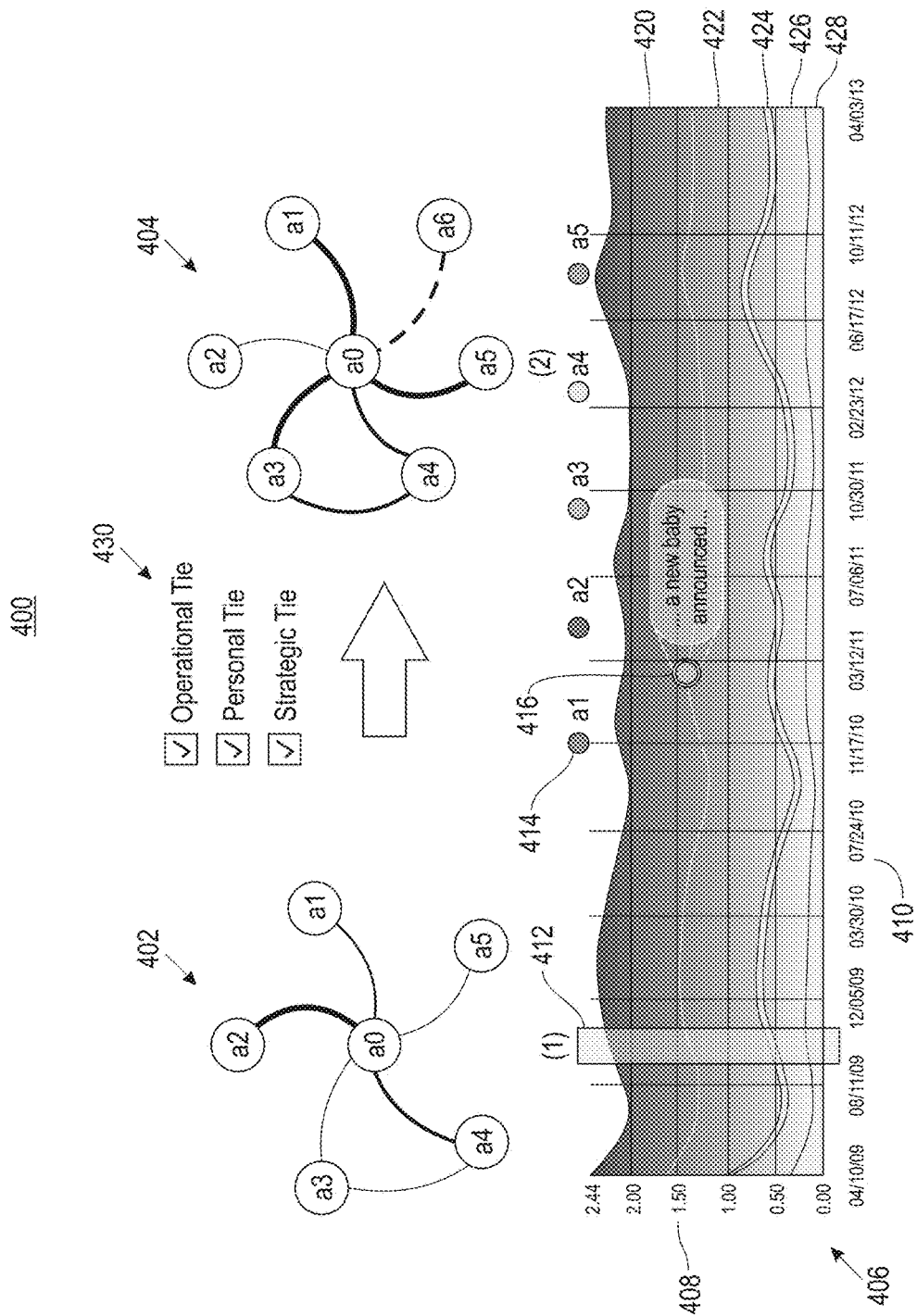
FIG. 4 depicts a visual interface for interactive visualization of relationship strengths in accordance with an embodiment.

FIG. 4 depicts a visual interface 400 for interactive visualization of relationship strengths in accordance with an embodiment as a graphical example of displayed content on the visual interface.

The visual interface 400 presents the dynamic relationships, as well as provides interaction tools that enable individuals to make sense of relationship evolvement at different time scales. The visualization includes two parts including a network view (views 402 and 404) and a temporal view (view 406). The network views 402/404 show a snapshot of a person's (a0) egocentric network at different times. For example, view 402 may reflect the state of relationships at a first point in time, and view 404 may reflect the state of the same relationships at a second point in time. The thickness of edges in the views (i.e., lines between a0 and each of a1-a5 for view 402, and lines between a0 and each of a1-a6 of view 404) shows the tie strength among two corresponding persons. Thus, as shown in FIG. 4, in view 402, the relationship between a0 and a2 is quite strong, while over time, as shown in view 404, the same relationship between a0 and a2 has weakened. Users can also focus on the tie strength of types of interest by checking relationship types (shown generally at 430). The edge width is updated over the time and new relationships can be added in the view, as shown in FIG. 4 (view 404, party a6) with visually distinguishing features (e.g., shown as a dotted line in FIG. 4).

The temporal view 406 further shows how the tie strength of multiple relationships changes over a more fluid period of time (e.g., as shown in view 406 as Apr. 10, 2009 through Apr. 3, 2013. Each relationship is depicted as a wave (420, 422, 424, 426, and 428). Each relationship may be color coded or otherwise distinguished using a key (e.g., a0-a1 414 may be green, which corresponds to a green wave 426). As shown in FIG. 4, the temporal view 406 includes a timeline axis 410 and a relationship strength axis 408. The relationship strength axis 408 may be implemented using any metric or scale of values desired. The relationship of interest can be specified by selecting points on the view 406 (e.g., a point having a large curvature), and attaching visualized event evidence (e.g., event 416) to facilitate the reasoning of relationship changes. Also, the visualization is supported by temporal zooming, and relationship curves selection to enable the visualization scheme of "overview first, zoom and filter, then detail-on-demand."

In addition, the two views of network 402/404 and time series (e.g., temporal view 406) may be coupled together. When a user selects a time frame of interest (e.g., as shown generally at 412), the temporal view 406 presents the snap shot of the tie strength during that time frame and also updates at least one of the network views 402 and 404 correspondingly. As a user drags the time frame along the timeline axis 410, the network view shows smooth dynamic changes with animation. This interaction offers users a sense of the evolution of their social networks.

In an embodiment, a user's interactivity with the visualization interface is recorded, and the system may adjust one or more relationship types or relative importance of a contact based on this interactivity. A feedback learning mechanism may be employed to learn from the user's behavior and periodically update the model based on feedback.

Figure 5:
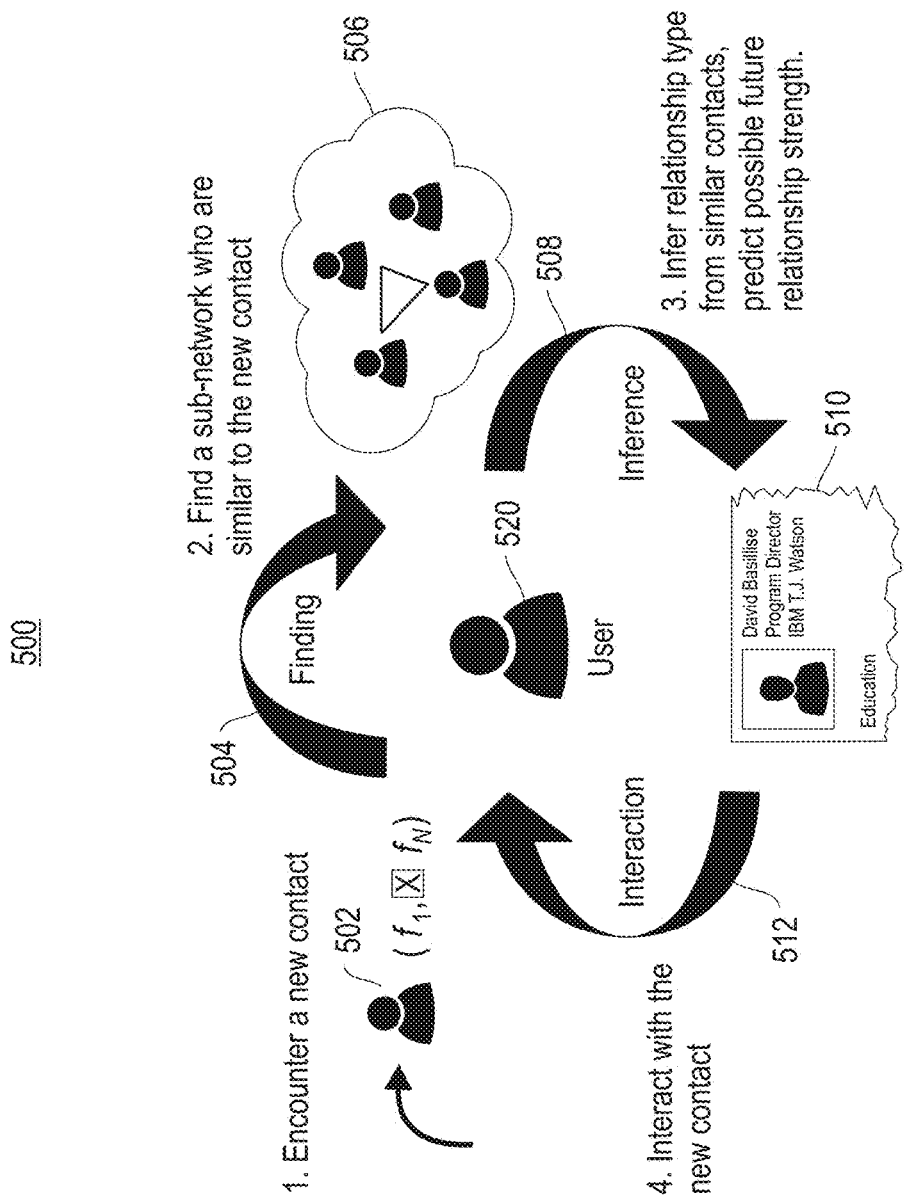
FIG. 5 depicts a sample application for profiling a new contact in accordance with en embodiment.

FIG. 5 depicts a view 500 of a sample application for profiling a new contact in accordance with an embodiment. The relationship modeling and visualization processes encounter a new contact 502 of a user 520 and find 504 a sub-network 506 of contacts who are similar to the new contact 502. The relationship modeling and visualization processes infer a relationship type from one or more similar contacts (e.g., contact 510) and predict a possible future relationship strength 508 between the new contact 502 and the user 520. The user 520 may interact 512 with the new contact 502.

Figure 6:
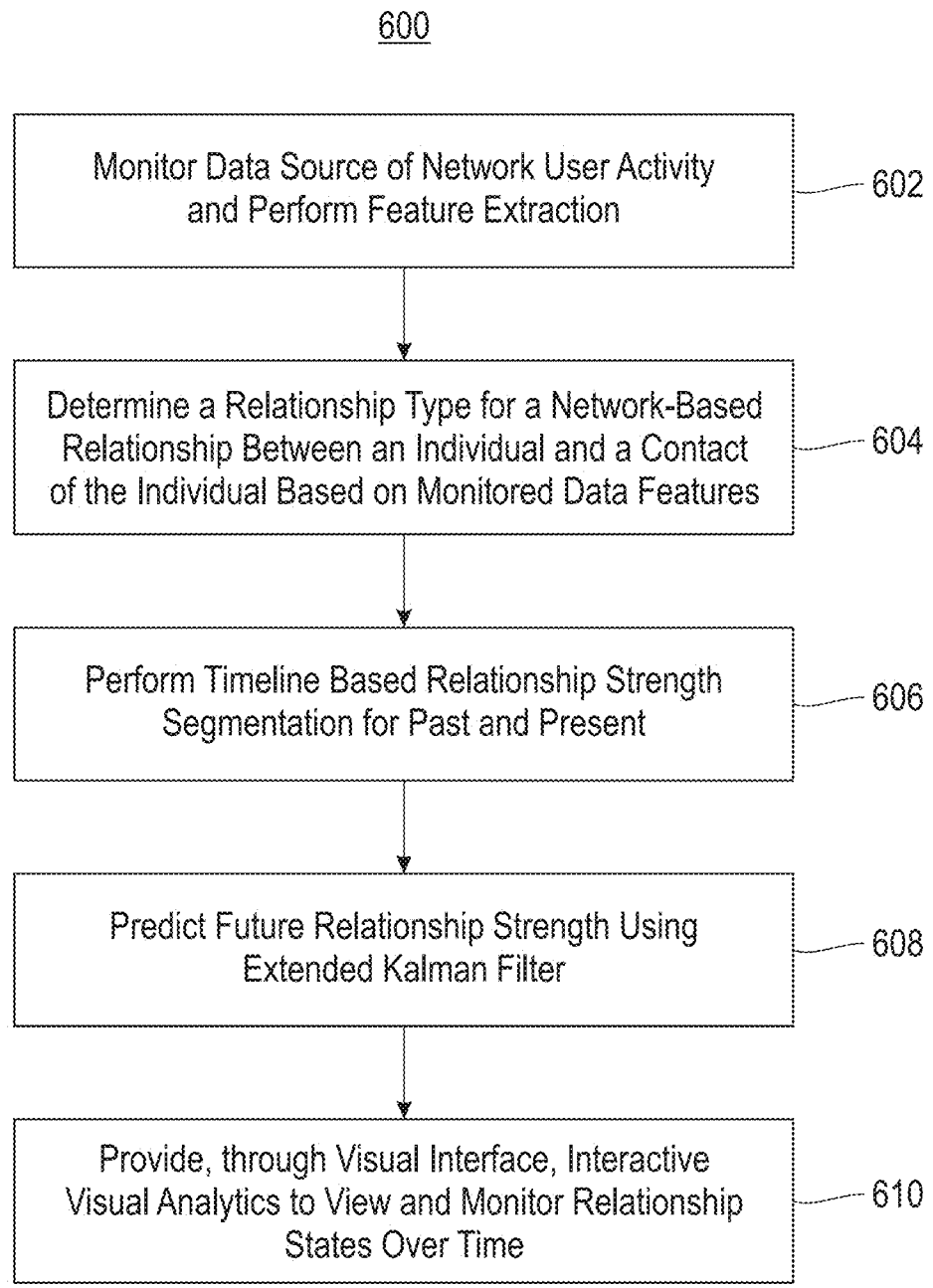
FIG. 6 depicts a process flow for relationship modeling and visualization in accordance with an embodiment.

Referring now to FIG. 6, a process flow of a method 600 for relationship modeling and visualization in accordance with an embodiment is illustrated. FIG. 6 is further described in reference to FIGS. 1-4. In this embodiment, the method 600 includes, at block 602, a data source is monitored for user activity and feature extraction is performed on the data resulting from the monitoring.

At block 604, a relationship type is determined for a network-based relationship between an individual and a contact of the individual based on monitored data features.

At block 606, the relationship modeling and visualization processes perform timeline-based relationship strength segmentation for past and present time periods.

At block 608, the relationship modeling and visualization processes predict a future relationship strength using EKF.

At block 610, the relationship modeling and visualization processes provide, through a visual interface, interactive visual analytics to view and monitor relationship states over time.

Figure 7:
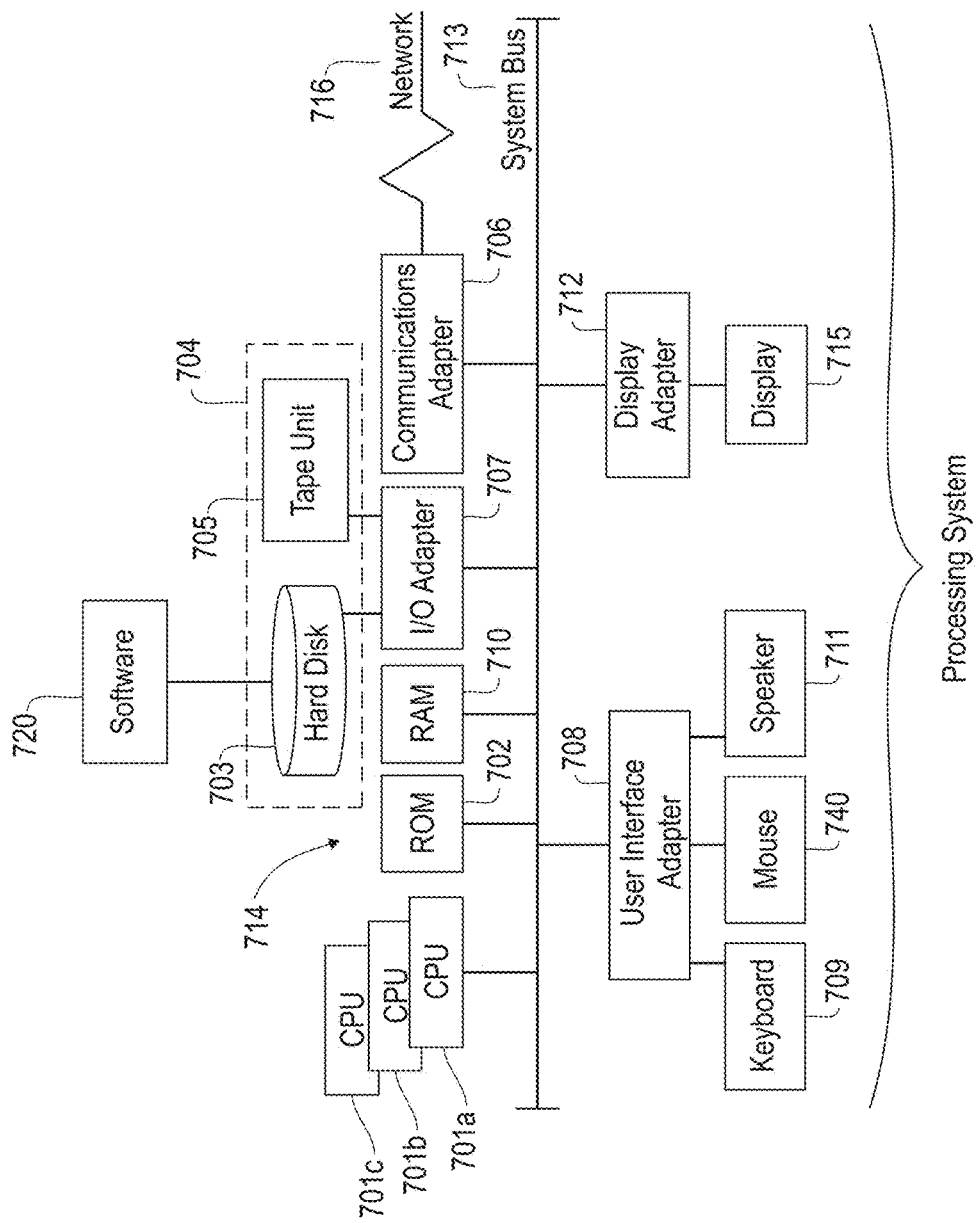
FIG. 7 depicts a processing system for relationship modeling and visualization in accordance with an embodiment.

Referring now to FIG. 7, there is shown an embodiment of a processing system 700 for implementing the teachings herein. In this embodiment, the processing system 700 has one or more central processing units (processors) 701a, 701b, 701c, etc. (collectively or generically referred to as processor(s) 701). Processors 701 are coupled to system memory 714 and various other components via a system bus 713. Read only memory (ROM) 702 is coupled to system bus 713 and may include a basic input/output system (BIOS), which controls certain basic functions of the processing system 700. The system memory 714 can include ROM 702 and random access memory (RAM) 710, which is read-write memory coupled to system bus 713 for use by processors 701.

FIG. 7 further depicts an input/output (I/O) adapter 707 and a network adapter 706 coupled to the system bus 713.

I/O adapter 707 may be a small computer system interface (SCSI) adapter that communicates with a hard disk 703 and/or tape storage drive 705 or any other similar component. I/O adapter 707, hard disk 703, and tape storage drive 705 are collectively referred to herein as mass storage 704. Software 720 for execution on processing system 700 may be stored in mass storage 704. Network adapter 706 interconnects system bus 713 with an outside network 716 enabling processing system 700 to communicate with other such systems. A screen (e.g., a display monitor) 715 is connected to system bus 713 by display adapter 712, which may include a graphics controller to improve the performance of graphics intensive applications and a video controller. In one embodiment, adapters 707, 706, and 712 may be connected to one or more I/O buses that are connected to system bus 713 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 713 via user interface adapter 708 and display adapter 712. A keyboard 709, mouse 740, and speaker 711 can be interconnected to system bus 713 via user interface adapter 708, which may include, for example, a Super I/O chip integrating multiple device adapters into a single integrated circuit.

Thus, as configured in FIG. 7, processing system 700 includes processing capability in the form of processors 701, and, storage capability including system memory 714 and mass storage 704, input means such as keyboard 709 and mouse 740, and output capability including speaker 711 and display 715. In one embodiment, a portion of system memory 714 and mass storage 704 collectively store an operating system such as the AIX® operating system from IBM Corporation to coordinate the functions of the various components shown in FIG. 7.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), astatic random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for relationship modeling and visualization from social media, the method comprising:
   determining a relationship type of a network-based relationship, between an individual and a network contact of the individual, from at least one social media data source, the relationship type determined using a relationship model based on relationship types comprising operational, personal, and business;
   performing timeline based relationship strength segmentation using group lasso, the timeline based relationship strength segmentation specifying a past and current strength of the relationship, the performing comprising:
   calculating, for each of a plurality of discrete time intervals, an interpersonal tie strength based at least in part on a similarity of features of the individual and the network contact of the individual, wherein the features are extracted from the social media data source and each of the features is weighted in the calculating based at least in part on the relationship type;
   predicting a future strength of the relationship using extended Kalman filter; and
   providing, through a visual interface on a display of a processor, interactive visual analytics to view and monitor relationship states including the past, current, and future strengths over time, the visual interface including a network view and a temporal view that are displayed concurrently on the display, wherein the network view shows a snapshot of an egocentric network of the individual at a selected point in time and the temporal view shows how interpersonal tie strengths of multiple relationships of the individual have changed over a period of time.

2. The method of claim 1, further comprising:
   extracting data from at least one data source associated with the relationship;
   wherein the relationship type is determined using multi-class support vector machine to train the data.

3. The method of claim 1, wherein the social media data source includes time variant data and time invariant data, the time invariant data including at least one of personality characteristics of the individual, inferred or expressed needs of the individual, and inferred or expressed values of the individual.

4. The method of claim 1, wherein the relationship is an ego-centric relationship.

5. The method of claim 1, further comprising:
   populating a temporal graph of the visual interface, at a corresponding point in a timeline, with an event attributed to the relationship between the individual and the contact.

6. The method of claim 1, further comprising:
   profiling a new contact of the individual, comprising:
   identifying the new contact in the network of the individual;
   determining at least one other contact in the network of the individual having similar features as the new contact;
   inferring a relationship type based on the similar features; and
   forecasting a future strength of a relationship between the new contact and the individual.

7. The method of claim 1, further comprising updating the visual interface based on ongoing activities conducted by the individual via the network.

8. A computer program product for relationship modeling and visualization, the computer program product comprising a computer readable storage medium having program code embodied therewith, the program code executable by a processor to:
   determining a relationship type of a network-based relationship, between an individual and a network contact of the individual, from at least one social media data source, the relationship type determined using a relationship model based on relationship types comprising operational, personal, and business;

performing timeline based relationship strength segmentation using group lasso, the timeline based relationship strength segmentation specifying a past and current strength of the relationship, the performing comprising:

calculating, for each of a plurality of discrete time intervals, an interpersonal tie strength based at least in part on a similarity of features of the individual and the network contact of the individual, wherein the features are extracted from the social media data source and each of the features is weighted in the calculating based at least in part on the relationship type;

predicting a future strength of the relationship using extended Kalman filter; and providing, through a visual interface on a display of the processor, interactive visual analytics to view and monitor relationship states including the past, current, and future strengths over time, the visual interface including a network view and a temporal view that are displayed concurrently on the display, wherein the network view shows a snapshot of an egocentric network of the individual at a selected point in time and the temporal view shows how interpersonal tie strengths of multiple relationships of the individual have changed over a period of time.

9. The computer program product of claim 8, further comprising:
extracting data from at least one data source associated with the relationship;
wherein the relationship type is determined using multi-class support vector machine to train the data.

10. The computer program product of claim 8, wherein the social media data source includes time variant data and time invariant data, the time invariant data including at least one of personality characteristics of the individual, inferred or expressed needs of the individual, and inferred or expressed values of the individual.

11. The computer program product of claim 8, wherein the relationship is an ego-centric relationship.

12. The computer program product of claim 8, further comprising:
populating a temporal graph of the visual interface, at a corresponding point in a timeline, with an event attributed to the relationship between the individual and the contact.

13. The computer program product of claim 8, further comprising:
profiling a new contact of the individual, comprising:
identifying the new contact in the network of the individual;
determining at least one other contact in the network of the individual having similar features as the new contact;
inferring a relationship type based on the similar features; and
forecasting a future strength of a relationship between the new contact and the individual.

14. The computer program product of claim 8, further comprising updating the visual interface based on ongoing activities conducted by the individual via the network.

15. A system for relationship modeling and visualization, the system comprising:

a memory having computer readable computer instructions; and
a processor for executing the computer readable instructions, the computer readable instructions including:
determining a relationship type of a network-based relationship, between an individual and a network contact of the individual, from at least one social media data source, the relationship type determined using a relationship model based on relationship types comprising operational, personal, and business;

performing timeline based relationship strength segmentation using group lasso, the timeline based relationship strength segmentation specifying a past and current strength of the relationship, the performing comprising:

calculating, for each of a plurality of discrete time intervals, an interpersonal tie strength based at least in part on a similarity of features of the individual and the network contact of the individual, wherein the features are extracted from the social media data source and each of the features is weighted in the calculating based at least in part on the relationship type;

predicting a future strength of the relationship using extended Kalman filter; and providing, through a visual interface on a display of the processor, interactive visual analytics to view and monitor relationship states including the past, current, and future strengths over time, the visual interface including a network view and a temporal view that are displayed concurrently on the display, wherein the network view shows a snapshot of an egocentric network of the individual at a selected point in time and the temporal view shows how interpersonal tie strengths of multiple relationships of the individual have changed over a period of time.

16. The system of claim 15, further comprising:
extracting data from at least one data source associated with the relationship;
wherein the relationship type is determined using multi-class support vector machine to train the data.

17. The system of claim 15, wherein the social media data source includes time variant data and time invariant data, the time invariant data including at least one of personality characteristics of the individual, inferred or expressed needs of the individual, and inferred or expressed values of the individual.

18. The system of claim 15, wherein the relationship is an ego-centric relationship.

19. The system of claim 15, further comprising:
populating a temporal graph of the visual interface, at a corresponding point in a timeline, with an event attributed to the relationship between the individual and the contact.

20. The system of claim 15, further comprising:
profiling a new contact of the individual, comprising:
identifying the new contact in the network of the individual;
determining at least one other contact in the network of the individual having similar features as the new contact;
inferring a relationship type based on the similar features; and
forecasting a future strength of a relationship between the new contact and the individual.

* * * * *